United States Patent
Kumar et al.

(10) Patent No.: US 11,833,919 B2
(45) Date of Patent: Dec. 5, 2023

(54) VEHICLE PROPULSION SYSTEM

(71) Applicant: Transportation IP Holdings, LLC, Norwalk, CT (US)

(72) Inventors: Ajith Kuttannair Kumar, Erie, PA (US); Patrick Lee Jansen, Schenectady, NY (US); Jeremy Thomas McGarry, Erie, PA (US); Peter Trotsch, Pittsburgh, PA (US); Alexander Bauer, Pittsburgh, PA (US); Bret C. Baird, Boise, ID (US)

(73) Assignee: Transportation IP Holdings, LLC, Norwalk, CT (US)

( * ) Notice: Subject to any disclaimer, the term of this patent is extended or adjusted under 35 U.S.C. 154(b) by 273 days.

(21) Appl. No.: 17/184,374

(22) Filed: Feb. 24, 2021

(65) Prior Publication Data
US 2021/0305882 A1  Sep. 30, 2021

Related U.S. Application Data

(60) Provisional application No. 62/994,648, filed on Mar. 25, 2020.

(51) Int. Cl.
*B60L 53/24* (2019.01)
*B60K 6/28* (2007.10)
(Continued)

(52) U.S. Cl.
CPC .......... *B60L 53/24* (2019.02); *B60K 6/28* (2013.01); *B60L 50/60* (2019.02); *B60L 58/19* (2019.02);
(Continued)

(58) Field of Classification Search
CPC .......... B60L 53/24; B60L 50/60; B60L 58/19; B60R 16/033; B60K 1/04; B60K 6/28;
(Continued)

(56) References Cited

U.S. PATENT DOCUMENTS 8,640,629 B2  2/2014  Barbee et al.
9,211,809 B2  12/2015  Pulliam et al.
(Continued)

FOREIGN PATENT DOCUMENTS

| EP | 2595309 A1 | * | 5/2013 | .............. B60L 11/12 |
| EP | 2810813 A1 | * | 12/2014 | .......... B60L 11/1809 |
| EP | 2810813 B1 | | 7/2017 | |

OTHER PUBLICATIONS

First Examination Report dated Sep. 1, 2022 for Indian Patent Application No. 202114010068.

*Primary Examiner* — Bickey Dhakal
(74) *Attorney, Agent, or Firm* — The Small Patent Law Group LLC; Joseph F. Harding

(57) ABSTRACT

A propulsion circuit for a vehicle includes an engine, a generator, a power rectifier, a direct current (DC) bus, a propulsion battery system, and at least one converter. The generator is coupled to the engine and configured to receive an input from the engine, and to provide an alternating current (AC) output. The power rectifier is configured to receive the AC output from the generator and provide a DC output responsive to receiving the AC output. The DC bus is coupled to the rectifier. The propulsion battery system is coupled to the DC bus. The at least one converter is configured to convert a direct current to an alternating current, and is coupled to the DC bus. Further, the propulsion circuit includes at least one charging component that is configured to selectably provide a charge to the battery system via at least one of the at least one converter.

20 Claims, 12 Drawing Sheets

(51) Int. Cl.
 B60L 50/60 (2019.01)
 B60L 58/19 (2019.01)
(52) U.S. Cl.
 CPC ..... *B60Y 2300/91* (2013.01); *B60Y 2400/112* (2013.01); *B60Y 2400/204* (2013.01)
(58) Field of Classification Search
 CPC . B60K 6/26; B60Y 2300/91; B60Y 2400/112; B60Y 2400/204; Y02T 10/62; Y02T 10/92; Y02T 90/14; H02K 11/04; H02J 7/0068; H02J 7/1492; H02P 3/14; H02P 27/04; H02P 27/06
 See application file for complete search history.

(56) References Cited

U.S. PATENT DOCUMENTS

| | | | |
|---|---|---|---|
| 2008/0116695 A1* | 5/2008 | Peterson | B60L 50/61 290/40 C |
| 2011/0273009 A1* | 11/2011 | Kumar | B60R 16/03 105/35 |
| 2012/0041630 A1* | 2/2012 | Yamamoto | B60W 10/08 180/65.265 |
| 2012/0098261 A1* | 4/2012 | Rozman | F02N 11/006 290/31 |
| 2013/0127413 A1* | 5/2013 | Ohtomo | B60L 53/14 320/109 |
| 2013/0268172 A1 | 10/2013 | Nandedkar et al. | |
| 2018/0334046 A1* | 11/2018 | Lee | B60L 15/007 |
| 2020/0044464 A1* | 2/2020 | Sasu | B60L 53/53 |
| 2020/0130531 A1* | 4/2020 | Wang | B60L 58/13 |
| 2020/0185936 A1* | 6/2020 | Oishi | B60L 53/63 |

* cited by examiner

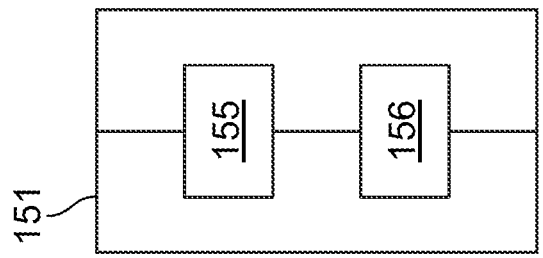
FIG. 13
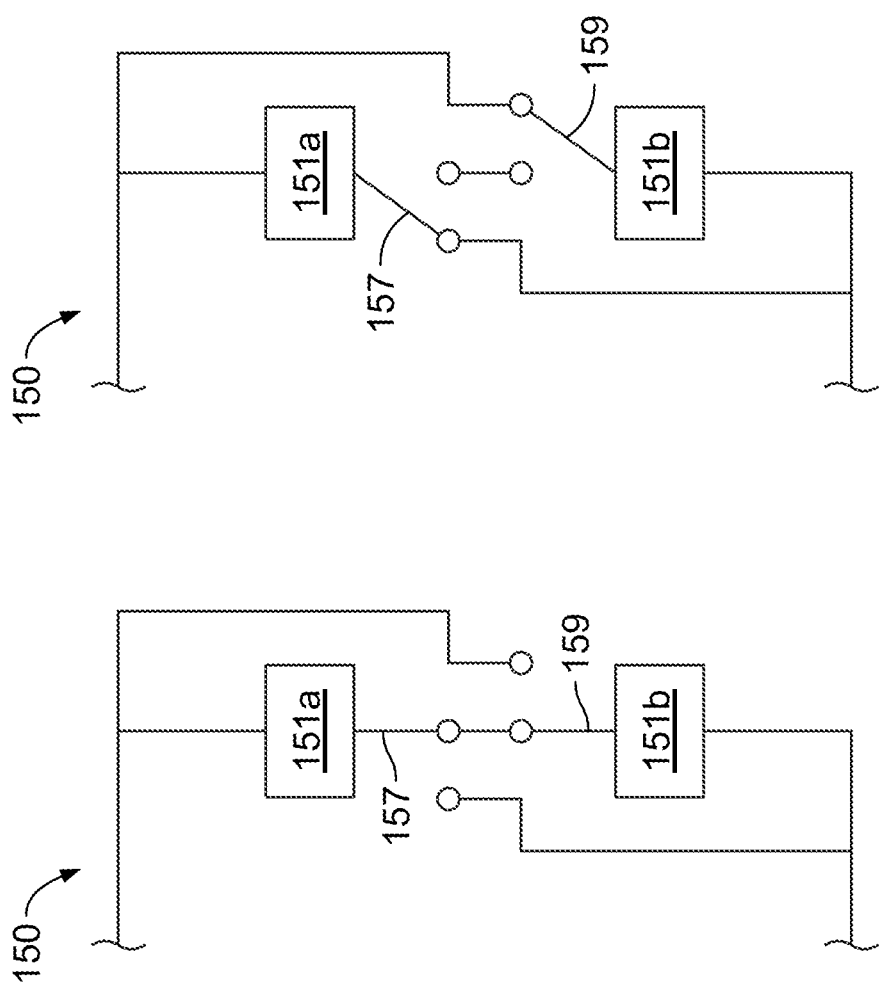
FIG. 12
FIG. 11

VEHICLE PROPULSION SYSTEM

RELATED APPLICATIONS

This application claims priority to U.S. Provisional Application No. 62/994,648, filed on 25 Mar. 2020 and entitled "Vehicle Propulsion System," the entire disclosure of which is incorporated by reference.

BACKGROUND

Technical Field

The subject matter described relates to systems and methods for use with vehicle propulsion systems, for example in connection with charging a battery of a propulsion system.

Discussion of Art

Hybrid vehicles use multiple sources of power for propulsion. For example, some hybrid vehicle may use an alternating current (AC) source along with a direct current (DC) source, such as a battery. The battery may be charged using the DC source. Some known systems use an AC source powered by an internal combustion engine to provide propulsive power and/or charge a battery. However, current approaches provide charging while the engine is operated at a high engine speed, resulting in engine wear as well as increased noise and emissions when the vehicle is stationary.

BRIEF DESCRIPTION

In one embodiment, a propulsion circuit for a vehicle includes an engine, a generator, a power rectifier, a direct current (DC) bus, a propulsion battery system, and at least one converter. The generator is coupled to the engine. The generator is configured to receive an input from the engine, and to provide an alternating current (AC) output. The power rectifier is configured to receive the AC output from the generator and provide a DC output responsive to receiving the AC output from the generator. The DC bus is coupled to the rectifier. The propulsion battery system is coupled to the DC bus. The at least one converter is configured to convert a direct current to an alternating current, and is coupled to the DC bus. Further, the propulsion circuit includes at least one charging component that is configured to selectably provide a charge to the battery system via at least one of the at least one converter.

In one embodiment, a propulsion circuit for a vehicle having an engine includes a generator, a power rectifier, a DC bus, a propulsion battery system, and at least one traction inverter. The generator is configured to be coupled to the engine, to receive an input from the engine, and to provide an alternating current (AC) output. The power rectifier is configured to receive the AC output from the generator and to provide a direct current (DC) output responsive to receiving the AC output from the generator. The DC bus is coupled to the rectifier. The propulsion battery system is coupled to the DC bus. The at least one traction inverter is coupled to the DC bus and to at least one corresponding traction motor. The propulsion circuit is configured to provide a first rectifier state configured to provide propulsion energy, and a second rectifier state configured to provide charging to the propulsion battery system via the at least one of the at least one converter.

In one embodiment, a propulsion circuit for a vehicle having an engine includes a generator, a power rectifier, a DC bus, a propulsion battery system, and at least one converter. The generator is configured to be coupled to the engine, to receive an input from the engine, and to provide an alternating current (AC) output. The power rectifier is configured to receive the AC output from the generator and to provide a direct current (DC) output responsive to receiving the AC output from the generator. The DC bus is coupled to the rectifier. The propulsion battery system is coupled to the DC bus, and includes a battery controller and plural battery units. The battery controller is configured to switch between a first configuration and a second configuration, wherein at least of some of the battery units are connected in parallel in the second configuration. The at least one converter is coupled to the DC bus, and is configured to convert a received direct current to a produced alternating current. The at least one converter is also configured to convert a received alternating current to a produced direct current and provide the produced direct current to the propulsion battery system. The propulsion circuit is configured to selectably provide a charge to the battery system via at least one of the at least one converter.

BRIEF DESCRIPTION OF THE DRAWINGS

The inventive subject matter may be understood from reading the following description of non-limiting embodiments, with reference to the attached drawings, wherein below:

FIG. 11 illustrates a block schematic diagram of an embodiment of a battery system in a first configuration;

FIG. 12 illustrates a block schematic diagram of the battery system of FIG. 11 in a second configuration;

FIG. 13 illustrates a block schematic diagram of an embodiment of a battery unit including plural batteries.

DETAILED DESCRIPTION

Embodiments of the subject matter described herein relate to systems and methods for providing charging to a propulsion battery of a vehicle system, for example a hybrid vehicle system. Various embodiments provide improved charging, for example, at lower engine speeds, providing reduced noise.

While various examples herein may be discussed in connection with hybrid rail vehicles, it may be noted that not all embodiments described herein are limited to hybrid systems or to rail vehicle systems. For example, one or more embodiments may be used in connection with electric vehicles. For example, one or more embodiments of the detection systems and methods described herein can be used in connection with other types of vehicles, such as automobiles, trucks, buses, mining vehicles, marine vessels, aircraft, agricultural vehicles, or the like.

Figure 1:
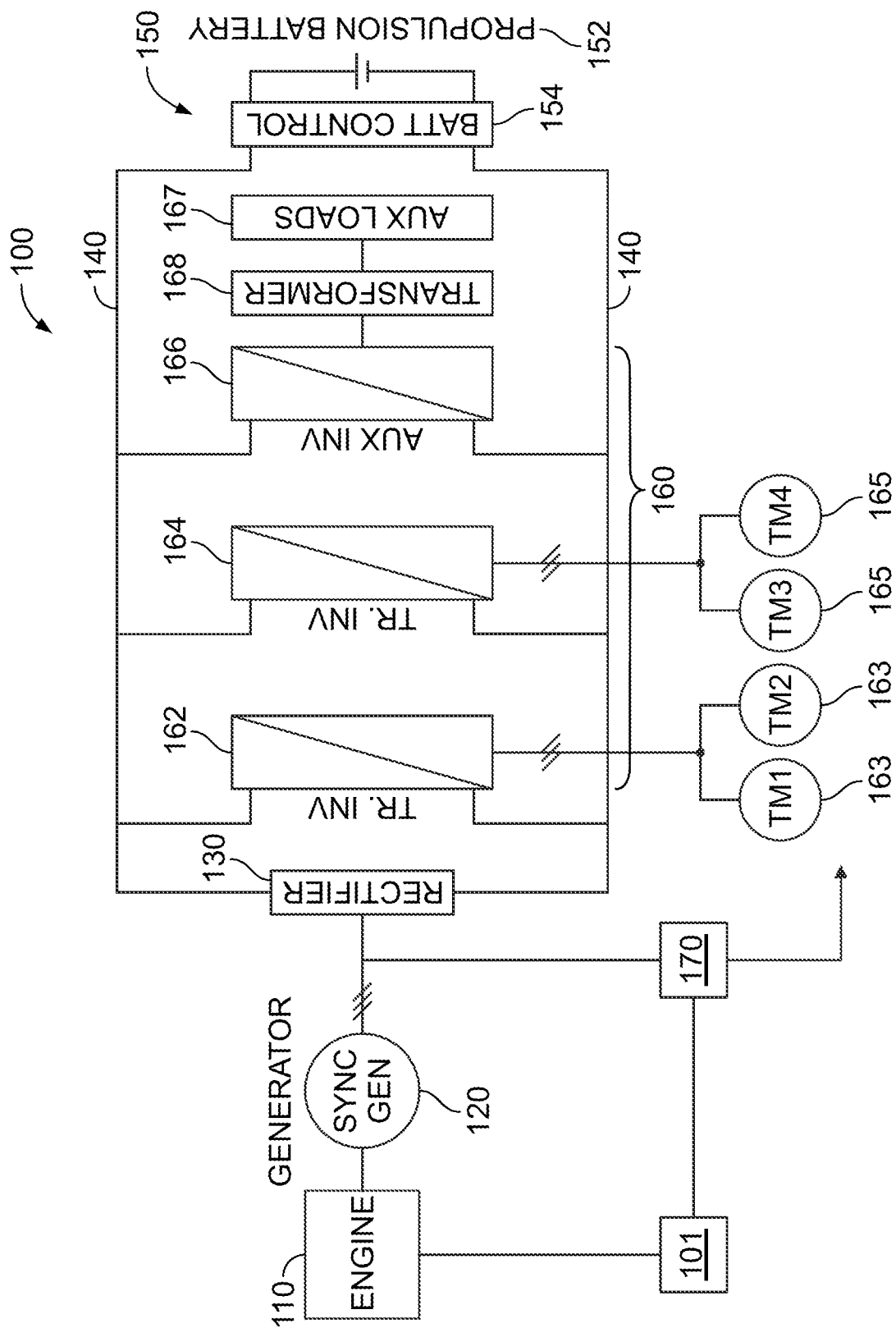
FIG. 1 illustrates a block schematic diagram of one embodiment of a propulsion circuit.

FIG. 1 illustrates a schematic diagram of a propulsion circuit 100 configured to provide propulsion and charging to a hybrid vehicle. The depicted propulsion circuit 100 may be used, for example, with a hybrid rail vehicle such as a hybrid locomotive or an off highway vehicle such as a mining truck. In the depicted example, the propulsion circuit 100 includes an engine 110, a generator 120, a power rectifier 130, a DC bus 140, a propulsion battery system 150, and at least one converter 160. The propulsion circuit 100 also includes a controller 101 configured to control operation of the propulsion circuit between various states or modes discussed herein (e.g., by controlling operation or settings of individual components and/or associated components such as switches). For ease of illustration, the controller 101 is shown coupled to the engine 110 and charging component 170 but may be coupled to other components alternatively or additionally. It may further be noted that the controller 101 is depicted as a single unit in FIG. 1, but may include multiple different units in various embodiments.

The engine 110 in various embodiments is an internal combustion engine. For example, the engine 110 may use a fuel such as diesel and/or natural gas to provide a mechanical energy output (e.g., rotation of a shaft) to the generator 120. The generator 120 is coupled to the engine 110, and receives an input from the engine 110 (e.g., the mechanical energy, for example in the form of a rotating shaft). The generator 120 provides an AC output that is generated responsive to the input received from the engine 110. For example, the generator 120 may be a permanent magnet generator including windings. The AC output in various embodiments is a 3-phase output. AC current, including the AC output from the generator 120 is schematically depicted by three diagonal lines in FIG. 1 and the remaining figures of the disclosure.

The power rectifier 130 receives the AC output from the generator 120 and provides a DC output responsive to receiving the AC output from the generator 120. Current from the power rectifier 130 is provided to the DC bus 140. The DC bus 140 is coupled to the power rectifier 130 as well as various components, and is used, for example, to provide DC from the propulsion battery system 150 to other components coupled to the DC bus 140, and, as another example, to provide DC for charging the propulsion battery system 150.

The depicted propulsion battery system 150 is coupled to the DC bus 140. The propulsion battery system 150 includes a propulsion battery 152 and battery control 154. Generally, the propulsion battery system 150 receives DC from the DC bus 140 to charge the propulsion battery 152, and provides DC to the DC bus 140 for use in propelling the vehicle (e.g., by providing DC to one or more inverters used to provide power to motors used to propel the vehicle). It may be noted that the propulsion battery 152 is depicted as a single unit in FIG. 1, but may include or represent multiple batteries joined in series and/or parallel in various embodiments.

The example propulsion circuit 100 includes one or more converters 160 coupled to the AC bus 140. The one or more converters 160 are configured to convert DC to AC. For example, the one or more converters 160 may receive DC from the propulsion battery system 150 via the DC bus 140, convert the DC to AC, and provide the AC to one or more sources, such as a motor or auxiliary device. As discussed herein, one or more of the converters 160 may be configured to also receive AC from a source, convert the AC to DC, and provide the DC to the DC bus 140 (e.g., for charging the propulsion battery 152).

In the illustrated embodiment, a number of converters are shown. The one or more converters of the depicted example include a first traction inverter 162, a second traction inverter 164, and an auxiliary inverter 166. The depicted traction inverters provide AC to corresponding traction motors. For example, first traction inverter 162 provides AC to first traction motor 163 (two first traction motors 163 are shown in the illustrated example), and the second traction inverter 164 provides AC to the second traction motor 165 (two section traction motors 165 are shown in the illustrated example). The number of traction inverters depends on the number of axles/traction motors in the vehicle (for example, many vehicles have 2, 4, 6, or 8 axles/traction motors; 4 axles/traction motors are shown in the illustrated embodiment) and the number of motors powered from each of the inverters (for example, often 1, 2, or 3 motors are powered from one inverter; 2 are powered by each traction inverter in the illustrated embodiment). During braking modes of operation, the traction inverter 162 charges the battery by converting the lower voltage AC power in the traction motors to the higher voltage DC bus which can be used to charge the battery or supply power to the auxiliaries. As another example of a converter, the depicted example propulsion circuit 100 also includes an auxiliary inverter 166 which is coupled to one or more auxiliary loads 167 via a transformer 168. Typically the auxiliary inverter will also contain reactors, filters, etc. (not shown) to generate the appropriate quality of power for the loads. In various embodiments, a lower output from the 3-phase AC is utilized by the auxiliary inverter 166, while a higher output from the 3-phase AC is utilized by the traction inverters 162, 164.

Charging energy may be provided to the propulsion battery 152 via the DC bus 140 directly from the power rectifier 130. However, if the power rectifier 130 is passive and the generator 120 output is synchronous to speed of the engine 110, high voltage may not be provided at low engine speeds, allowing for charging only at high engine speeds, which may result in unwanted noise and/or emissions, especially when the vehicle is stationary. If the power rectifier 130 is active or the generator 120 is asynchronous to engine 110 speed, they may be undesirably heavy. Accordingly, in the illustrated example of FIG. 1, the propulsion circuit 100 includes a charging component 170. The charging component 170 (e.g., under direction of the controller 101) is configured to selectably provide a charge to the battery system 150 via at least one of the at least one converter 160 (e.g., via a traction inverter and/or the auxiliary inverter). Depending on how the charging component 170 is configured (e.g., which of two or more states the charging component 170 is in), the propulsion circuit 100 may be used to propel the vehicle, and/or provide charge to the propulsion battery system. For example, in a first state of the propulsion system 100 (e.g., the charging component 170 or aspect thereof), the one or more converters 160 may receive DC from the propulsion battery system 150 via the DC bus 140, convert the DC to AC, and provide the AC to one or more sources, such as a motor or auxiliary device. As another example, in a second state of the propulsion system 100 (e.g., the charging component 170 or aspect thereof), the one or more converters 160 may receive AC from a source (e.g., the generator 120 via one or more intermediate components), convert the AC to DC, and provide DC to the propulsion battery system 150 via the DC bus 140 to charge the propulsion battery 152. The charging component 170 is shown schematically as a block in FIG. 1; however, it may be noted that the charging component 170 may represent plural components disposed along one or more circuit paths and/or may also be incorporated in part or in whole with other components depicted in FIG. 1. Further, the charging component 170 is shown schematically as having an open-ended connection in FIG. 1, which represents that the charging components 170 may be coupled to one or more additional components and/or be disposed along one or more circuit paths as discussed herein. In various embodiments, the charging component 170 may include or be represented by routing components, such as contactors or transfer switches, along with associate components such as wiring and/or controllers (e.g., for operating switches). Various examples showing particular circuit paths and/or components used to selectably provide charge to the battery are discussed in connection with FIGS. 2-10. The examples of FIGS. 2-10 may be generally similar to the example of FIG. 1 and share one or more aspects of FIG. 1, with particular features of each example discussed below. It may be noted that elements 240, 340, 440, 510, 650, 710, 850, and 910 of the examples below may be understood as representing charging component 170, and/or routing components, and/or aspects thereof in various embodiments.

Figure 2:
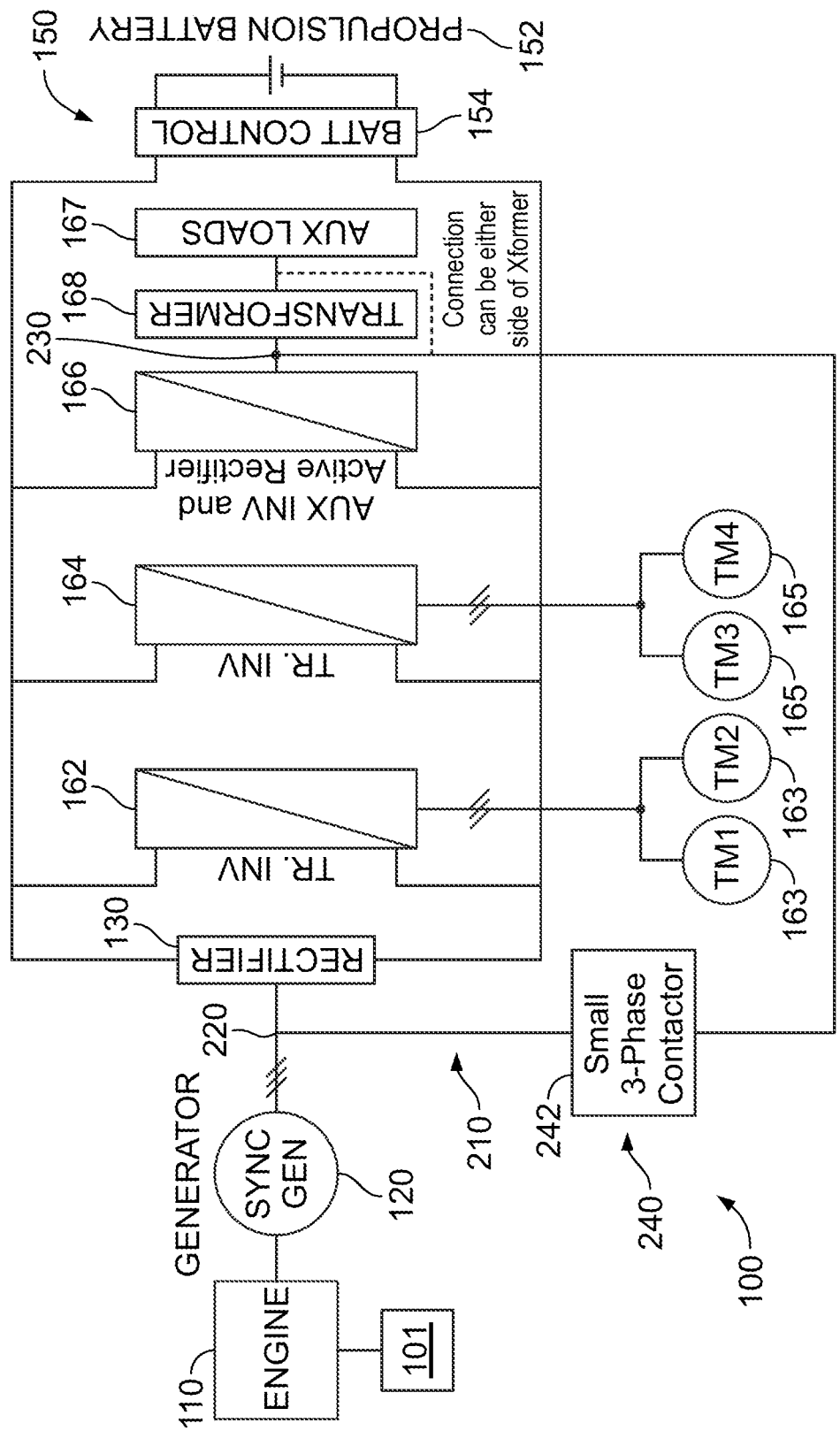
FIG. 2 illustrates an example of the propulsion circuit of FIG. 1.

For example, FIG. 2 depicts an example of the propulsion system 100 that provides a direct connection from the generator 120 to the auxiliary load (i.e., without passing through the power rectifier 130). The example propulsion circuit 100 of FIG. 2 includes a circuit path 210 that is coupled to a first point 220 and a second point 230 (e.g., extends between and/or has end points at the first point 220 and the second point 230). The first point 220 is interposed between the generator 120 and the power rectifier 130. The second point 230 is interposed between the auxiliary inverter 166 and the at least one auxiliary load 167. It may be noted that the second point 230 may be on either side of the transformer 168 with respect to the auxiliary load 167. The depicted propulsion circuit 100 also includes a routing component 240 disposed along the circuit path 210. The routing component 240 in various embodiments includes a 3-phase contactor 242. The routing component 240 has a second state in which current is provided along the circuit path 210, and a first state in which current is inhibited along the circuit path 210. Accordingly, in the second state, current is allowed to pass from the generator 120 to the at least one auxiliary load 167 along circuit path 210, but current along the circuit path 210 is inhibited in the first state. In the second state, with current provided along the circuit path 210, a charge may be provided to the propulsion battery 152 by operating the auxiliary inverter 166 in an active rectifier mode (in this mode the lower voltage at 230 can be used to charge the higher voltage battery using inductances typically present in filters (not shown), transformers or the inherent inductance of the generator 120). In the illustrated example, the routing component 240 is a small 3-phase connector that permits passage of relatively lower power. Accordingly, the example of FIG. 2 may be used at low engine power levels, such as when the vehicle is stationary. In various embodiments, the generator 120 (e.g., a sync generator), is configured to provide low power at an auxiliary load frequency. The example propulsion circuit 100 of FIG. 1 provides charging energy to the propulsion battery 150 at relatively low engine speeds, thereby reducing engine noise and emissions when charging, for example when the vehicle is stationary.

Figure 3:
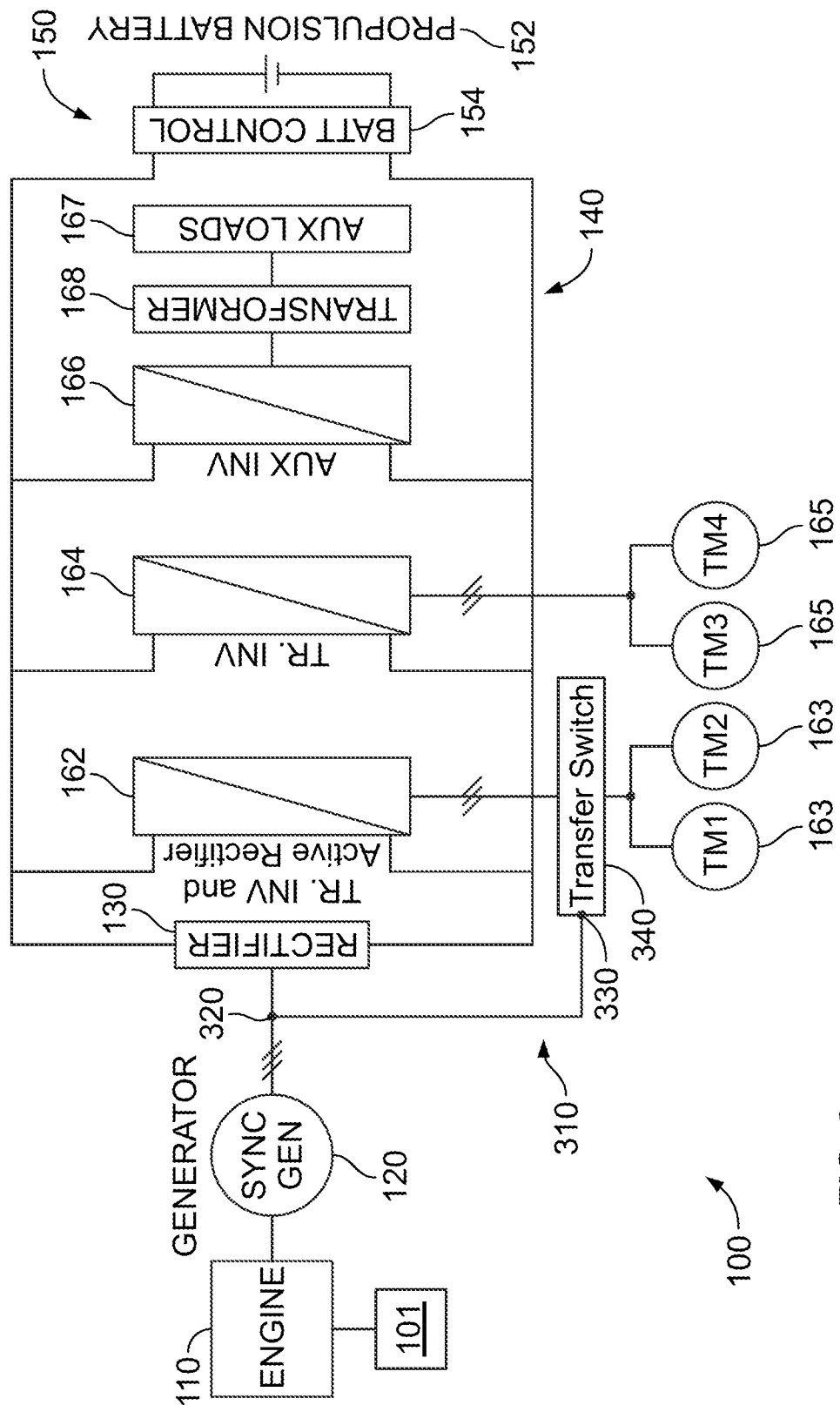
FIG. 3 illustrates an example of the propulsion circuit of FIG. 1.

As another example, FIG. 3 depicts an example of the propulsion circuit 100 in which a traction inverter is used to provide charge to the propulsion battery 152. In the example of FIG. 3, the depicted propulsion circuit 100 includes a circuit path 310 that coupled to a first point 320 and a second point 330 (e.g., extends between and/or has endpoints at the first point 320 and the second point 330). The first point 320 is interposed between the generator 120 and the power rectifier 130, and the second point 330 is interposed between the first traction inverter 162 and the first traction motor 163. The example propulsion circuit 100 of FIG. 3 also includes a routing component 340 (e.g., a transfer switch) disposed along the circuit path 310 and interposed between the first traction inverter 162 and first traction motor 163. The routing component 340 controls the flow of current and selectably directs current from the generator 120 to the first traction inverter 162 in a second state, allowing the traction inverter 162 to be used to receive AC from the generator 120 and output DC for charging the propulsion battery 152 via the DC bus 140. In the second state, output from the alternator is provided to the first traction motor inverter 162, which in turn supplies the second traction inverter 164, auxiliary inverter 166, and propulsion battery 152 via the DC bus 140. In a first state, the routing component 340 allows AC from the first traction inverter 162 to be provided to the first traction motor 163. Accordingly, in the second state, the first traction inverter 162 may be used to charge the propulsion battery 152, while the second traction inverter 164 is used to provide AC to the second traction motor 165 to propel the vehicle. In the first state, both traction inverters provide propulsive power to their respective corresponding traction motors. For example, the second state may be used to charge the propulsion battery 152 when the vehicle is stationary or operating at lower speeds, and the first state may be used to propel the vehicle at higher speeds.

In various other examples, additionally or alternatively to having the capability to use a converter as discussed above, the propulsion circuit 100 is configured to provide two or more rectifier states (e.g., under the direction of the controller 101) for selectably charging the propulsion battery 152. For example, a first rectifier state in various embodiments is configured to provide propulsion energy (e.g., without charging the propulsion battery 152), and the second rectifier state is configured to provide charging to the propulsion battery system 152 via at least one of the converters (e.g., first traction inverter 162, second traction inverter 164, auxiliary inverter 166). In some embodiments, both charging and propulsion are provided in the second rectifier state. It may be noted that a rectifier state may define, for example, a condition of a single rectifier (e.g., a source of current to a given rectifier), or, as another example, may define a particular rectifier or rectifier being used (e.g., a first rectifier in a first rectifier state of a system, and a second, different rectifier in a second rectifier state of the system). FIGS. 4-9 provide example of propulsion circuits that utilize first and second rectifier states for selectably charging the propulsion battery 152.

Figure 4:
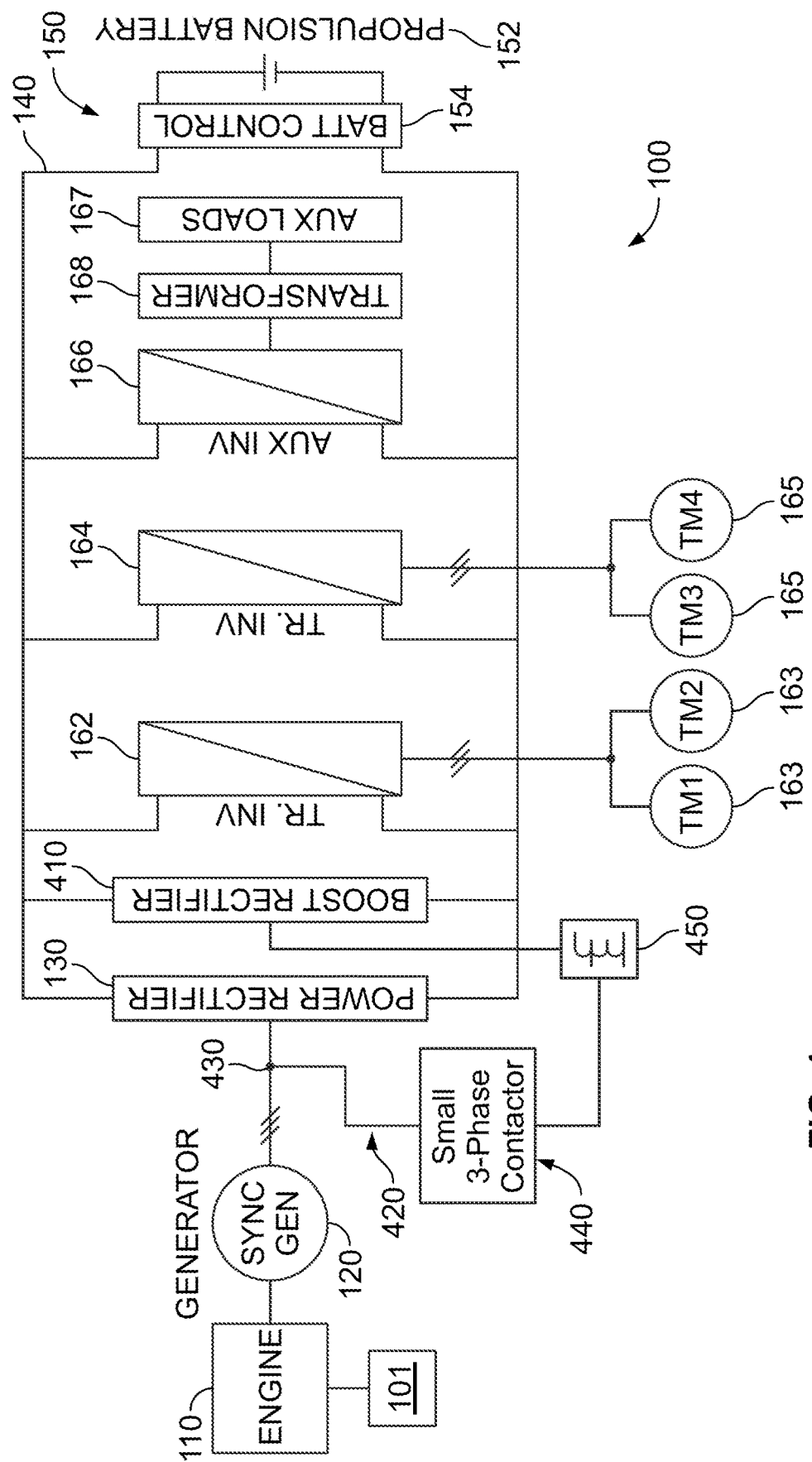
FIG. 4 illustrates a block schematic diagram of another embodiment of a propulsion circuit.

For example, FIG. 4 provides an example of the propulsion circuit 100 which includes a boost rectifier 410. The boost rectifier 410 in various embodiments is similar to the power rectifier 130 and is a passive (simple uncontrolled diode) rectifier. In the first rectifier state, current is routed through the power rectifier 130, and in the second state, current is routed through the boost rectifier 410. As seen in FIG. 4, the boost rectifier 410 of the example propulsion circuit 100 is coupled to the DC bus 140. A circuit path 420 is coupled to a first point 430 and the boost rectifier 410 (e.g., extends between and/or has endpoints at the first point 430 and the boost rectifier 410). The first point 430 is located between the generator 120 and the power rectifier 130. The propulsion circuit 100 also includes a routing component 440 disposed along the circuit path 420. The routing component 440, for example, may be a small 3-phase connector. Current may be directed to the boost generator 410 via the small 3-phase connector at low engine speeds and/or low traction power, for example for use with auxiliaries and/or stationary operation. In the illustrated example, the propulsion circuit 100 of FIG. 4 includes a transformer 450 disposed along the circuit path 420. In some embodiments, an auto-transformer (shown) may be used to provide a voltage boost at low engine speeds. A step up transformer (not shown) could also be used. Since the voltage at the input to 410 is higher (due to the autotransformer action) than that of the input to 130, the rectifier 130 will not conduct (will be back biased).

Figure 5:
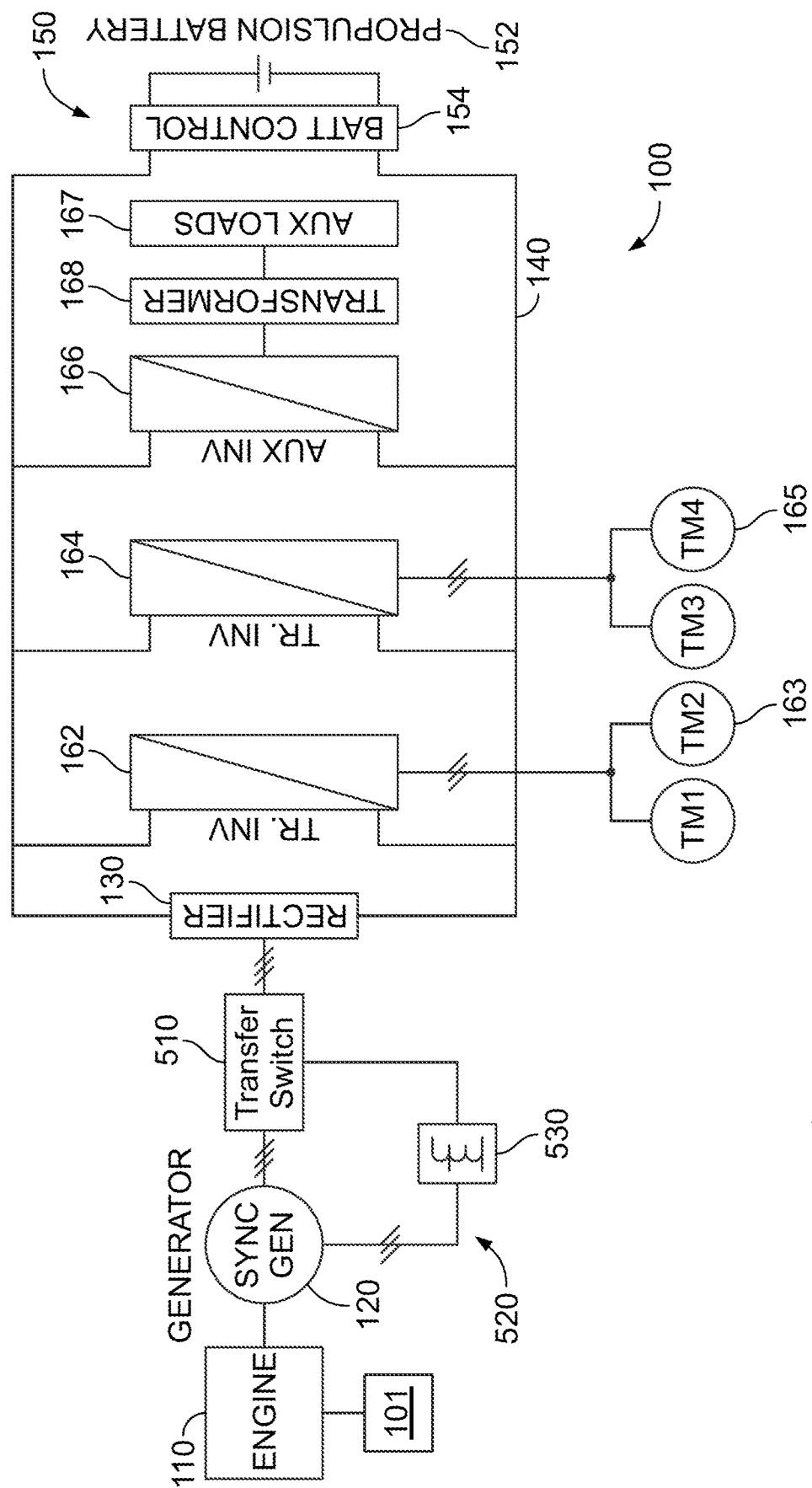
FIG. 5 illustrates a block schematic diagram of another embodiment of a propulsion circuit.

As another example, FIG. 5 provides an example of the propulsion circuit 100 that utilizes a transfer switch to provide a voltage boost at low engine speeds. The propulsion circuit 100 of FIG. 5 includes a transfer switch 510 that is interposed between the generator 120 and the power rectifier 130. The depicted example propulsion circuit 100 also includes a circuit path 520 coupled to (e.g., extending between) the generator 120 and the transfer switch 510, and a transformer 530 disposed along the circuit path 520. The transfer switch 510 is selectably operated to provide current for relatively higher power operation directly from the generator to the rectifier for propulsive efforts, or, at lower engine speeds or power, to direct current through the transformer 530 to provide a voltage boost for charging the propulsion battery 152.

In some embodiments, the rectifier state may be defined at least in part by windings of the generator 120. For example, in various embodiments, the generator 120 comprises an alternator that defines a first winding portion and a second winding portion. The first rectifier state corresponds to using one of the first winding portion or the second winding portion, and the second rectifier state corresponds to using the other of the first winding portion or the second winding portion. It may be noted that either the first rectifier state or the second rectifier state may use a combination of windings in some embodiments. FIGS. 6-9 provide examples using winding portions that define rectifier states.

Figure 6:
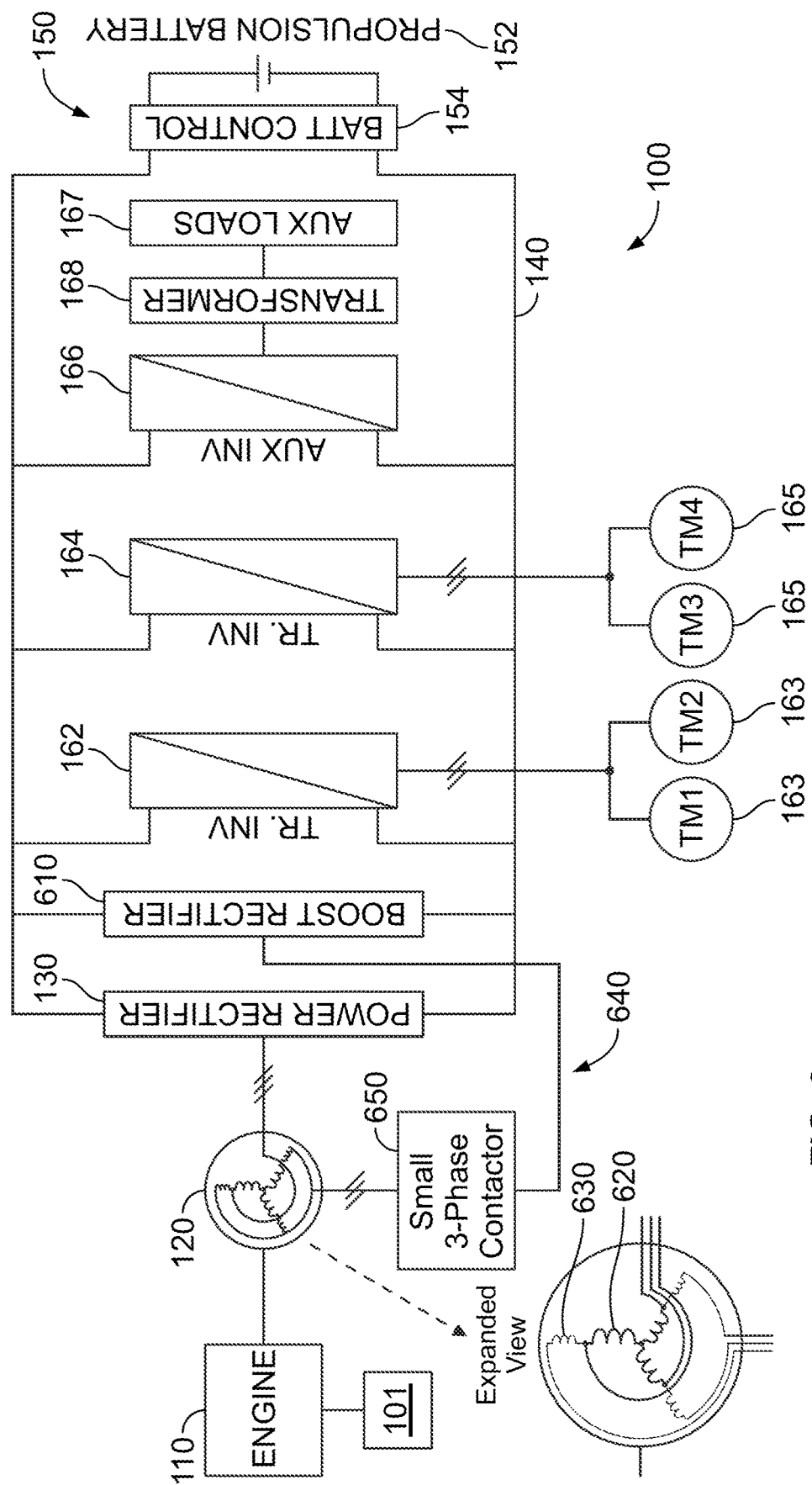
FIG. 6 illustrates a block schematic diagram of another embodiment of a propulsion circuit.

For example, FIG. 6 provides an example of the propulsion circuit 100 in which the generator 120 comprises an alternator having an inner winding portion 620 and an outer winding portion 630, which provide examples of the first winding portion and the second winding portion. In the example of FIG. 6, the inner winding portion 620 and the outer winding portion 630 are wired in series. For example, the inner winding portion 620 may be used as a traction winding that may provide a lower voltage than generally required for charging, with the outer winding portion 630 added to extend the voltage for charging. The example propulsion circuit 100 of FIG. 6 also includes a boost rectifier 610 coupled to the DC bus 140, and a circuit path 640 coupled to (e.g., extending between) the outer winding portion 630 and the boost rectifier 610. Further, the example propulsion circuit 100 of FIG. 6 also includes a routing component 650 (e.g., small 3-phase contactor) disposed along the circuit path 640. In a first rectifier state, current is directed from the inner winding portion 620 to the power rectifier 130. In a second rectifier state, current is directed from the outer winding portion 630 (and accordingly through both the inner winding portion 620 and the outer winding portion 630 because they are wired in series) through the routing component 650 and to the boost rectifier 610. In some embodiments, the inner winding portion 620 and the outer winding portion 630 have different current ratings. For example, the inner winding portion 620 may have a higher current rating since it provides higher traction requirements as well as auxiliaries during normal operation, whereas the outer winding portion 630 may have a lower current capability since it only provides auxiliaries and battery charging.

Figure 7:
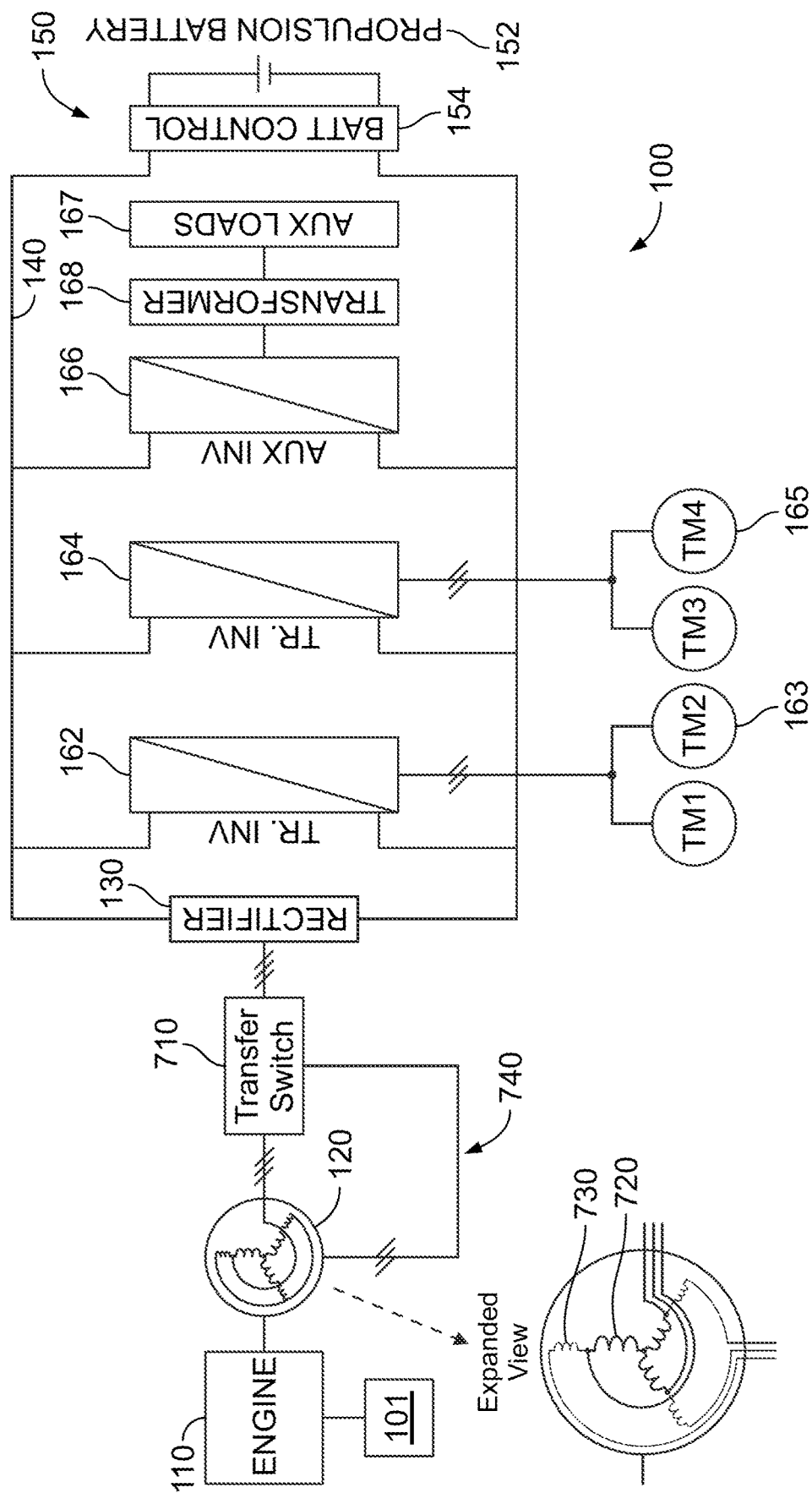
FIG. 7 illustrates a block schematic diagram of another embodiment of a propulsion circuit.

As another example, FIG. 7 provides another example of the propulsion circuit 100 in which the generator 120 comprises an alternator having an inner winding portion 720 and an outer winding portion 730 that are joined in series, which provide examples of the first winding portion and the second winding portion. In contrast to the example of FIG. 6, the propulsion circuit of FIG. 7 includes a transfer switch 710 interposed between the inner winding portion 720 and the power rectifier 130, and a circuit path 740 coupled to (e.g., extending between) the outer winding portion 730 and the transfer switch 710. In a first rectifier state, current is routed directly from only the inner winding portion 720 to the power rectifier 130. In a second rectifier state, current is routed from the outer winding portion 730 to the power rectifier 130. It may be noted that the inner winding portion 720 and the outer winding portion 730 may have different current ratings. Further, while a series winding is shown in the depicted winding portions 720 and 730, it should be noted that other forms of changing the voltage may be utilized, such as delta-Wye (delta-star) connections. In the case of a delta-wye configuration the voltage ratio will be a fixed 1.73, whereas in the illustrated case a range of ratios are available.

Figure 8:
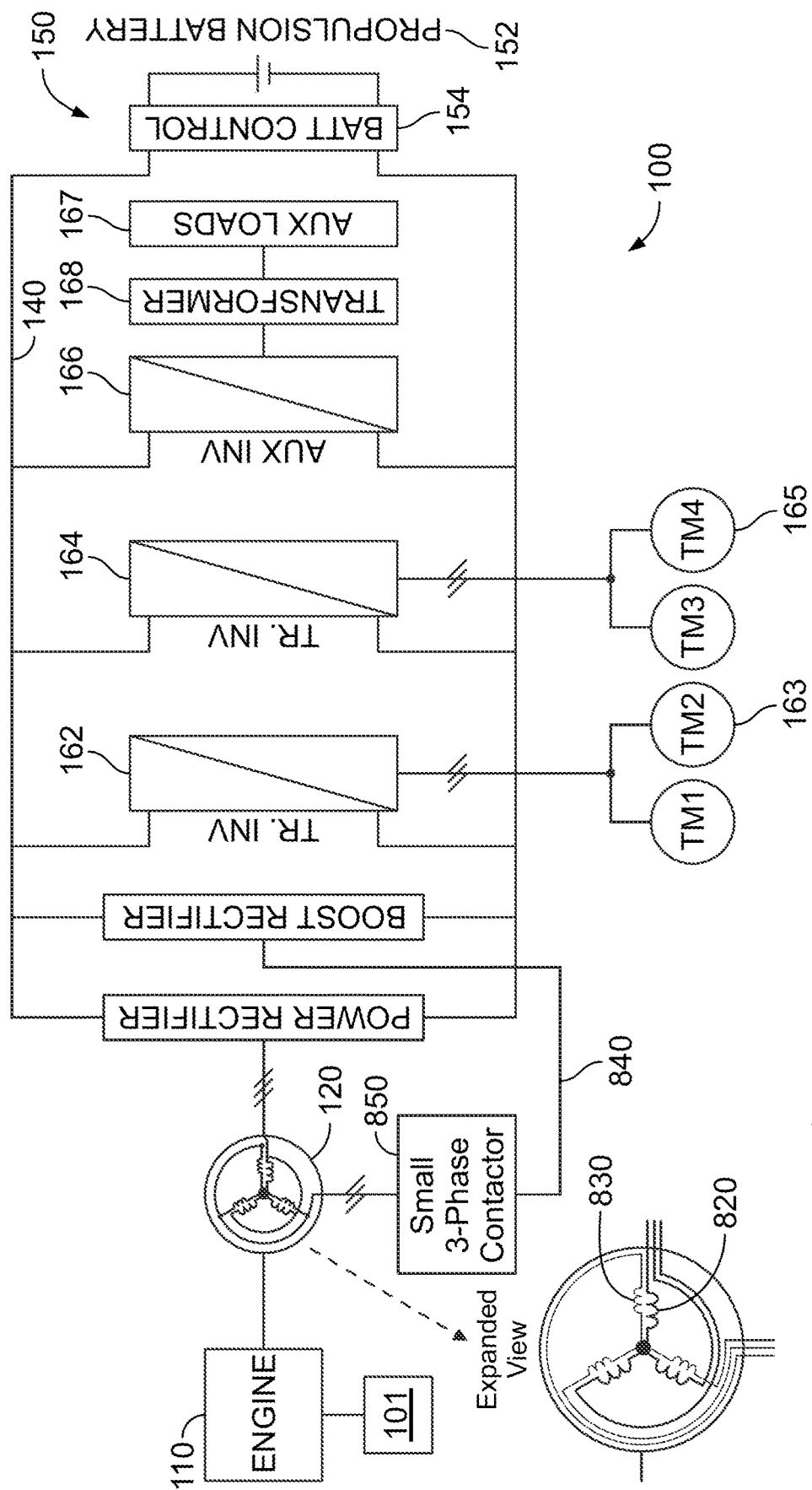
FIG. 8 illustrates a block schematic diagram of another embodiment of a propulsion circuit.

As another example, FIG. 8 provides an example of the propulsion circuit 100 in which the generator 120 comprises an alternator having a first winding portion 820 and second winding portion 830. In the example of FIG. 8, the first winding portion 820 and the second winding portion 830 are wired independently. For example, the first winding portion 820 may be used as a traction winding, with the second winding portion 830 providing a separate low current, high voltage independent auxiliary winding. The example propulsion circuit 100 of FIG. 8 also includes a boost rectifier 810 coupled to the DC bus 140, and a circuit path 820 coupled to (e.g., extending between) the second winding portion 830 and the boost rectifier 810. Further, the example propulsion circuit 100 of FIG. 8 also includes a routing component 850 (e.g., small 3-phase contactor) disposed along the circuit path 840. In a first rectifier state, current is directed from the first winding portion 820 to the power rectifier 130. In a second rectifier state, current is directed from the second winding portion 830 through the routing component 850 and to the boost rectifier 810. It may be noted that the winding portions 820 and 830 could have different current ratings in various embodiments, and/or different phase angles.

Figure 9:
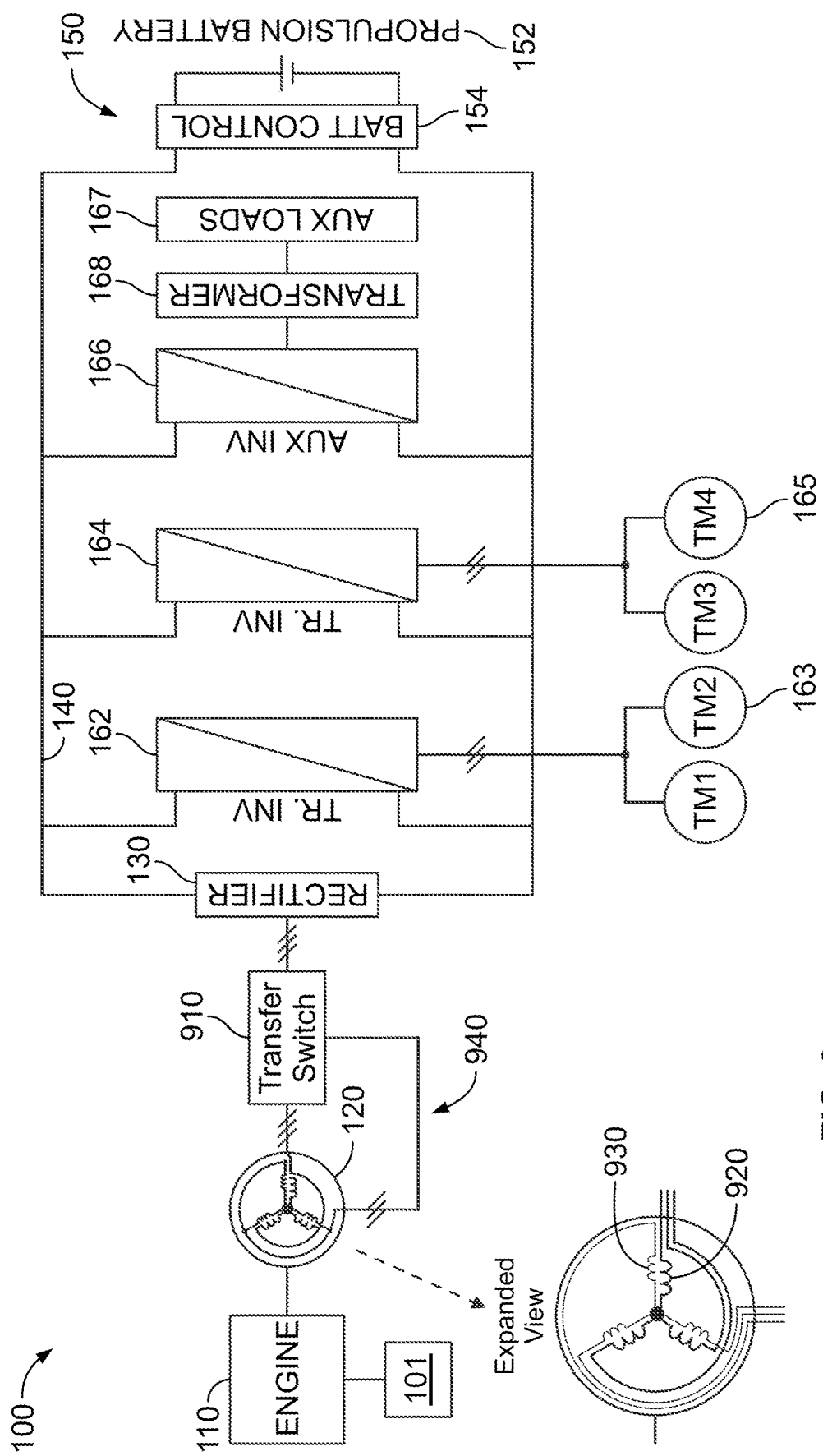
FIG. 9 illustrates a block schematic diagram of another embodiment of a propulsion circuit.

As another example, FIG. 9 provides another example of the propulsion circuit 100 in which the generator 120 comprises an alternator having a first winding portion 920 and second winding portion 930 that are independently wired. In contrast to the example of FIG. 8, the propulsion circuit 100 of FIG. 9 includes a transfer switch 910 interposed between the first winding portion 920 and the power rectifier 130 and coupling the first winding portion 920 to the power rectifier 130, and a circuit path 940 coupled to (e.g., extending between) the second winding portion 930 and the transfer switch 910. In a first rectifier state, current is routed directly from the first winding portion 920 to the power rectifier 130. In a second rectifier state, current is routed from the second winding portion 930 to the power rectifier 130. It may be noted that, similar to the example discussed in FIG. 7, a delta-wye connection (or other configuration) may be used in other embodiments.

Figure 10:
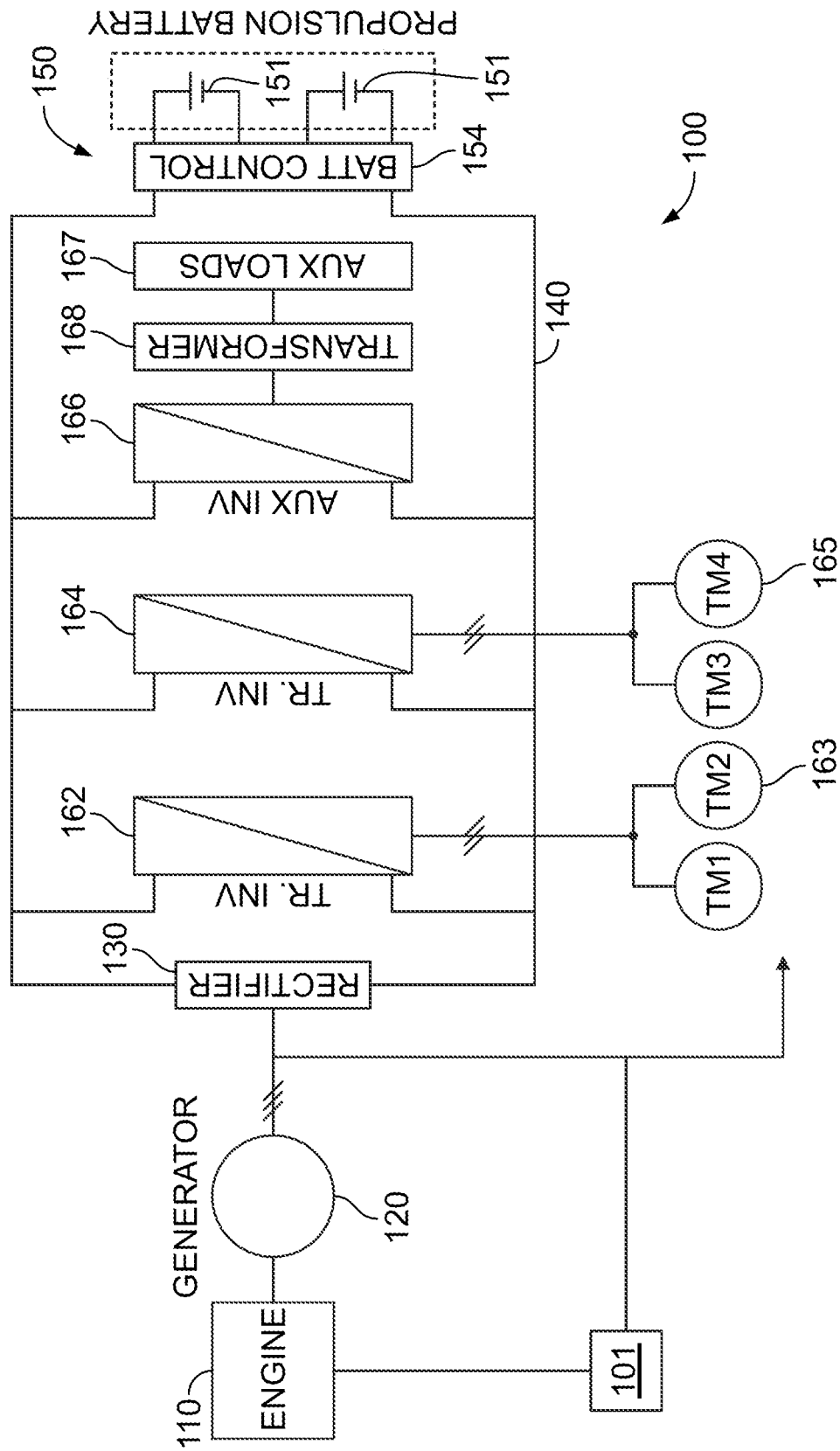
FIG. 10 illustrates a block schematic diagram of another embodiment of a propulsion circuit having a configurable battery.

As another example, FIG. 10 provides an example embodiment of the propulsion circuit 100 in which the connections between battery units may be switched between parallel and series to provide advantageous operation and charging. Generally, the example of FIG. 10 may be utilized in connection with embodiments that include an alternator that does not have active voltage control, or embodiments that utilize a passive rectifier (e.g., in examples where rectifier 130 is passive).

As seen in FIG. 10, the example propulsion circuit 100 of FIG. 10 includes an engine 110, a generator 120, a power rectifier 130, a DC bus 140, a propulsion battery system 150, and at least one converter (e.g., traction inverters 162, 164; auxiliary inverter 166).

Generally, the generator 120 is configured to be coupled to the engine 110, and to receive an input from the engine 110. In various embodiments, the generator 120 includes an alternator without active voltage control. Responsive to receiving the input from the engine 110, the generator provides an AC output. The power rectifier 130 receives the AC output from the generator 120 and provides a DC output responsive to receiving the AC output from the generator 120. In some embodiments, the power rectifier 130 is a passive rectifier. The DC bus 140 is coupled to the rectifier 130, and the propulsion battery system 150 is coupled to the DC bus 140. The at least one converter is coupled to the DC bus and is configured to convert a received direct current to a produced alternating current. The at least one converter is also configured to convert a received alternating current to a produced direct current, and to provide the produced direct current to the propulsion battery system 150. The propulsion circuit 100 illustrated in FIG. 10 is configured to selectably provide a charge to the propulsion battery system 150 via at least one of the at least one converter (e.g., traction inverters 162, 164; auxiliary inverter 166).

Figure 14:
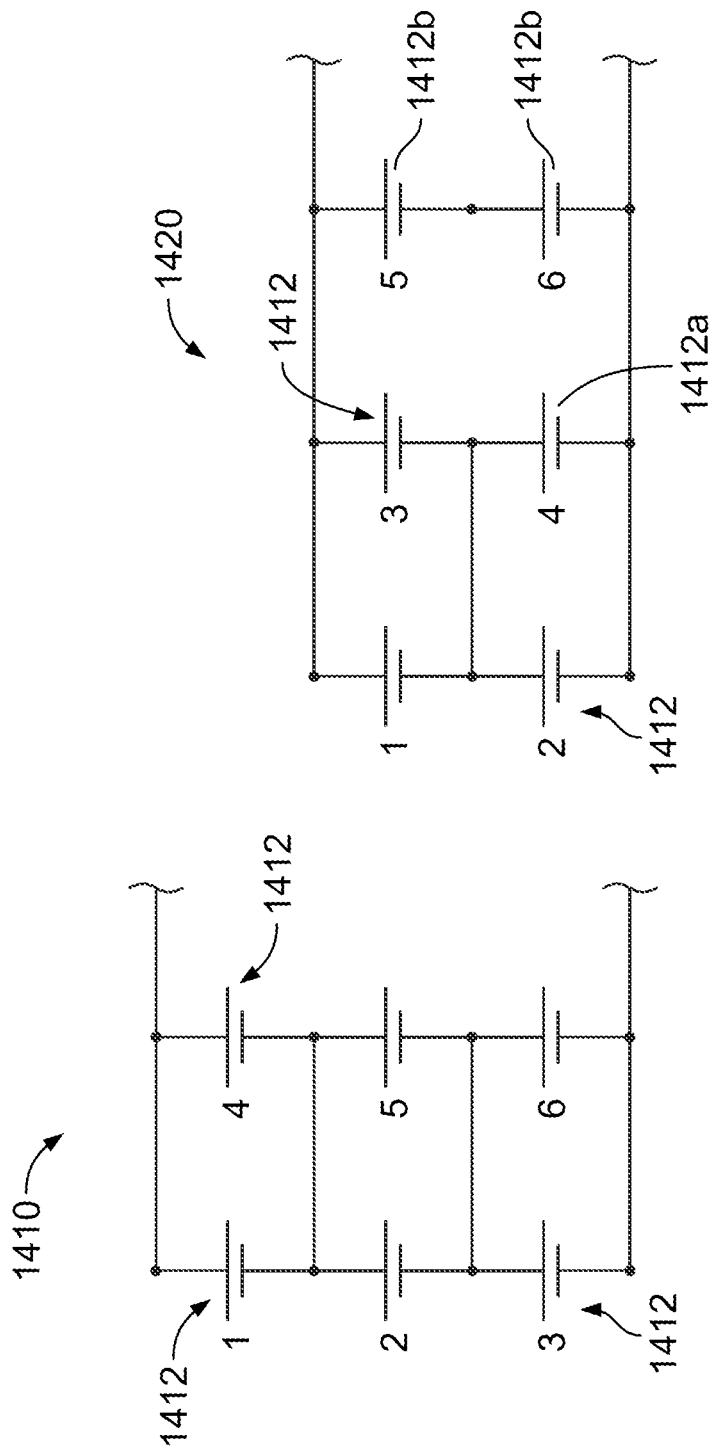
FIG. 14 illustrates a block schematic illustration of different series/parallel combinations of batteries.

The various elements depicted in FIG. 10 may be generally similarly to like-numbered elements described elsewhere herein in various aspects. However, the example propulsion circuit 100 of FIG. 10 is configured to allow switching between different configurations of battery units of the propulsion battery system 150. For example, the propulsion circuit in various embodiments is configured to switch between a high voltage connection mode and a low voltage connection mode. Switching between parallel and series combination connections provides on example of achieving high and low voltage modes. Alternatively, different arrangements of combinations of series and parallel connections may be used to provide high and low voltage modes. By way of example, FIG. 14 illustrates a 3S2P configuration 1410 that utilizes arrangements of 3 batteries 1412 in series and 2 batteries 1412 in parallel. A 2S3P configuration 1420 is also shown in FIG. 14. The 2S3P configuration utilizes arrangements of 2 batteries 1412 in series and 3 batteries 1412 in parallel. By utilizing appropriately configured switching connections, a group of 6 batteries could be switched between the 3S2P configuration and the 2S3P configuration as appropriate, with the 2S3P configuration providing a voltage that is ⅔ that of the 3S2P configuration.

Returning to FIG. 10, in the illustrated embodiment, the propulsion battery system 150 includes a battery controller 154 and plural battery units 151. The battery controller 154 is configured to switch between a first configuration and a second configuration of connections between battery units 151. In the second configuration at least some of the battery units 151 are connected in parallel. It may be noted that in various embodiments the battery controller 154 (or aspects thereof) may form a part of or work in connection with the controller 101.

FIG. 11 provides an example of battery units in a first configuration and FIG. 12 provides an example of battery units in a second configuration. The example propulsion battery system 150 of FIGS. 11 and 12 includes battery unit 151a, battery unit 151b, switch 157, and switch 159. Switch 157 and switch 159 may be controlled by battery controller 154 (not shown in FIGS. 11 and 12; see FIG. 10). It should be noted that the example of FIGS. 11 and 12 includes only 2 battery units for ease of illustration; however, other numbers of battery units and arrangements of battery units connected in parallel in the second configuration may be employed in other embodiments. For example, in some embodiments, more than two battery units may be used, and, in the second configuration, some battery units may be connected in parallel and some may be connected in series. It may be further noted that if more than two battery units are utilized, the battery units may be connected in differing series-parallel configurations (e.g., as shown in FIG. 14).

In FIG. 11, the switches 157 and 159 are positioned to connect battery unit 151a and battery unit 151b in series. This is the first configuration for the example embodiment. In FIG. 12, the switches 157 and 159 are in different positions, and instead the battery unit 151a and battery unit 151b are connected in parallel. This is the second configuration for the example embodiment. Accordingly, by controlling the switches to be in the appropriate positions, the battery units may be selectably positioned to be connected in either series or parallel. It should be noted that the switching arrangement depicted in FIG. 11 is provided by way of example for illustrative purposes, and that other arrangements for moving between a first configuration (e.g., series connections) and a second configuration (e.g., parallel connections) may be employed in alternate embodiments.

It may be further noted that individual battery units 151 may in turn include plural batteries. FIG. 13 depicts an example battery unit 151 that includes a first battery 155 and a second battery 156 connected in series. It should be noted that the example of FIG. 13 includes only 2 batteries for ease of illustration; however, other numbers of batteries and arrangements of batteries may be employed in other embodiments (e.g., as discussed in connection with FIG. 14).

With continued reference to FIG. 10, in some embodiments, the battery controller 154 is configured to switch between the second configuration and the first configuration based on a mode of operation of the vehicle. For example, the first configuration may be used for general operation of the vehicle, and the second configuration for charging the propulsion battery system. Example modes of operation in some embodiments include a first mode of battery-only operation, a second mode of hybrid (battery plus engine) operation, and a third mode of engine-only operation. In some embodiments, the second configuration may only be entered into during the third mode of engine only operation while the battery is charging. Further, the second configuration may only be entered into during a particular stage of charging (e.g., when battery units are near top of charge). In some embodiments, the battery controller 154 may only switch to the second configuration responsive to the vehicle entering a stationary charging mode, in which the vehicle is not moving.

As discussed herein, the battery controller 154 is configurable such that the multiple battery units 151 are selectably connected in series (e.g., first configuration) or in parallel (e.g., second configuration). During normal motoring (battery discharging) operation, the battery units are connected in series. However, during charging, especially near top-of-charge, the battery units are connected in parallel, thereby halving the voltage of the DC bus 140 and permitting the engine speed to be approximately halved. Accordingly, engine wear, acoustic noise and emissions may be greatly reduced. Mode switching between series and parallel connections can be accomplished using various different techniques, including the use of contactors, transfer switches, or the like located within the battery controller 154 and/or operated under direction of the battery controller 154.

In some embodiments, the battery controller 154 enables switching between series and parallel modes only when battery current flow is at or near zero. Further, in some embodiments, the battery units 151 would be connected in parallel only if the voltages and/or state-of-charge of the individual units were nearly identical to prevent excessive in-rush (re-balancing) currents to flow between units.

In various embodiments, the battery controller 154 is configured to independently connect and disconnect individual battery units 151 from the DC bus 140, including the connection of any single battery unit to the DC bus in parallel mode and/or switching individual batteries or groups of batteries between high and low voltage modes. By so doing, the battery controller 154 enables the charging or discharging of individual battery units to essentially any desired level; thereby permitting the matching of battery unit voltages and/or states-of-charge. This may be particularly beneficial to facilitate replacement of battery units by matching a new battery unit to the existing units, or vice versa. For example, with reference to FIG. 14, the individual batteries 1412 may be independently connectable to a DC bus. If battery 1412a has a lower charge than batteries 1412b, batteries 1412b may be disconnected from the DC bus while battery 1412a is connected to the DC bus during at least a portion of charging, allowing the charge in battery 1412a to be increased to equal the charge in batteries 1412b.

As used herein, the terms "processor" and "computer," and related terms, e.g., "processing device," "computing device," and "controller," may be not limited to just those integrated circuits referred to in the art as a computer, but refer to a microcontroller, a microcomputer, a programmable logic controller (PLC), field programmable gate array, and application specific integrated circuit, and other programmable circuits. Processors, computer, and controllers (e.g., controller 101 and/or battery controller 154) discussed herein include memory (e.g., a tangible and non-transitory memory) in various embodiments. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, processes or activities described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, a propulsion circuit for a vehicle having an engine includes a generator, a power rectifier, a DC bus, a propulsion battery system, at least one converter, and at least one charging component. The generator is configured to be coupled to the engine, to receive an input from the engine, and to provide an alternating current (AC) output. The power rectifier is configured to receive the AC output from the generator and provide a direct current (DC) output responsive to receiving the AC output from the generator. The DC bus is coupled to the rectifier. The propulsion battery system is coupled to the DC bus. The at least one converter is configured to convert a received direct current to a produced alternating current, and is coupled to the DC bus. The at least one charging component is configured to selectably provide a charge to the propulsion battery system via at least one of the at least one converter.

Optionally, the at least one converter comprises at least one traction inverter and an auxiliary inverter. The at least one traction inverter is coupled to the DC bus, and is coupled to at least one corresponding traction motor. The auxiliary inverter is coupled to the DC bus and to at least one auxiliary load.

Optionally, the propulsion circuit includes a circuit path and a routing component. The circuit path is coupled to a first point interposed between the generator and the power rectifier, and a point between the auxiliary inverter and the at least one auxiliary load. The routing component is disposed along the circuit path. The routing component has a first state in which current is provided along the circuit path and a second state in which current is inhibited along the circuit path. The routing component can be a 3-phase connector.

Optionally, the at least one traction inverter includes a first traction inverter coupled to a first traction motor, and a second traction inverter coupled to a second traction motor, with the propulsion circuit including a circuit path and a routing component. The circuit path is coupled to a first point interposed between the generator and the power rectifier and a point between first traction inverter and the first traction motor, with the routing component interposed between the first traction inverter and the first traction motor In one embodiment, a propulsion circuit for a vehicle having an engine includes a generator, a power rectifier, a DC bus, a propulsion battery system, and at least one traction inverter. The generator is configured to be coupled to the engine, to receive an input from the engine, and to provide an alternating current (AC) output. The power rectifier is configured to receive the AC output from the generator and to provide a direct current (DC) output responsive to receiving the AC output from the generator. The DC bus is coupled to the rectifier. The propulsion battery system is coupled to the DC bus. The at least one traction inverter is coupled to the DC bus and to at least one corresponding traction motor. The propulsion circuit is configured to provide a first rectifier state configured to provide propulsion energy, and a second rectifier state configured to provide charging to the propulsion battery system via the at least one of the at least one converter.

Optionally, the propulsion circuit also includes a boost rectifier, a circuit path, a routing component, and a transformer. The boost rectifier is coupled to the DC bus. The circuit path is coupled to a first point between the generator and the power rectifier, and to the boost rectifier. The routing component is disposed along the circuit path, and the transformer is disposed along the circuit path.

Optionally, the propulsion circuit also includes a transfer switch, a circuit path, and a transformer. The transfer switch is interposed between the generator and the power rectifier. The circuit path is coupled to the generator and the transfer switch, and the transformer is disposed along the circuit path.

Optionally, the generator includes an alternator defining a first winding portion and a second winding portion, with the first rectifier state corresponding to one of the first winding portion or the second winding portion, and the second rectifier state corresponding to the other of the first winding portion or the second winding portion. The propulsion circuit can include a boost rectifier coupled to the DC bus. The first winding portion can be an inner winding portion and the second winding portion can be an outer winding portion, with the inner winding portion and outer winding portion connected in series. The propulsion circuit can include a circuit path coupled to the outer winding portion and the boost rectifier, and a routing component disposed along the circuit path.

The first winding portion can be an inner winding portion and the second winding portion can be an outer winding portion, with the inner winding portion and outer winding portion connected in series. The propulsion circuit can also include a transfer switch interposed between the inner winding portion and the power rectifier, and a circuit path coupled to the outer winding portion and the transfer switch.

The propulsion circuit can include a boost rectifier coupled to the DC bus, and the first winding portion can be coupled to the power rectifier. The propulsion circuit can also include a circuit path coupled to the second winding portion and the boost rectifier, and a routing component disposed along the circuit path.

The first winding portion can be coupled to the power rectifier. The propulsion circuit can include a transfer switch interposed between the first winding portion and the power rectifier, and a circuit path coupled to the second winding portion and the transfer switch.

In one embodiment, a propulsion circuit for a vehicle having an engine includes a generator, a power rectifier, a DC bus, a propulsion battery system, and at least one converter. The generator is configured to be coupled to the engine, to receive an input from the engine, and to provide an alternating current (AC) output. The power rectifier is configured to receive the AC output from the generator and to provide a direct current (DC) output responsive to receiving the AC output from the generator. The DC bus is coupled to the rectifier. The propulsion battery system is coupled to the DC bus, and includes a battery controller and plural battery units. The battery controller is configured to switch between a first configuration and a second configuration, wherein at least of some of the battery units are connected in parallel in the second configuration. The at least one converter is coupled to the DC bus, and is configured to convert a received direct current to a produced alternating current. The at least one converter is also configured to convert a received alternating current to a produced direct current and provide the produced direct current to the propulsion battery system. The propulsion circuit is configured to selectably provide a charge to the battery system via at least one of the at least one converter.

Optionally, the battery controller is configured to switch between the second configuration and the first configuration based on a mode of operation of the vehicle. The battery controller can be configured to switch to the second configuration responsive to the vehicle entering a stationary charging mode.

Optionally, the generator comprises an alternator without active voltage control.

Optionally, the propulsion circuit includes a passive rectifier.

Optionally each battery unit includes plural batteries. The battery controller can be configured to independently connect and disconnect each battery unit.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A propulsion circuit for a vehicle having an engine comprising:
    a generator configured to be coupled to the engine, and configured to receive an input from the engine, and to provide an alternating current (AC) output;
    a power rectifier configured to receive the AC output from the generator and provide a direct current (DC) output responsive to receiving the AC output from the generator;
    a DC bus coupled to the rectifier;
    a propulsion battery system coupled to the DC bus;
    at least one converter configured to convert a received direct current to a produced alternating current, the at least one converter coupled to the DC bus; and
    at least one charging component configured to selectably provide a charge to the propulsion battery system via the at least one converter by re-directing at least a portion of the AC output from the generator to the at least one converter without passing through the power rectifier.

2. The propulsion circuit of claim 1, wherein the at least one converter comprises:
   at least one traction inverter coupled to the DC bus, the at least one traction inverter coupled to at least one corresponding traction motor; and
   an auxiliary inverter coupled to the DC bus, the auxiliary inverter coupled to at least one auxiliary load.

3. The propulsion circuit of claim 2, further comprising:
   a circuit path coupled to a first point interposed between the generator and the power rectifier and a point between the auxiliary inverter and the at least one auxiliary load; and
   a routing component disposed along the circuit path, the routing component having a first state in which current is provided along the circuit path and a second state in which current is inhibited along the circuit path.

4. The propulsion circuit of claim 3, wherein the routing component is a 3-phase connector.

5. The propulsion circuit of claim 2, wherein the at least one traction inverter comprises a first traction inverter coupled to a first traction motor, and a second traction inverter coupled to a second traction motor, the propulsion circuit further comprising:
   a circuit path coupled to a first point interposed between the generator and the power rectifier and a point between first traction inverter and the first traction motor; and
   a routing component interposed between the first traction inverter and the first traction motor.

6. A propulsion circuit for a vehicle having an engine comprising:
   a generator configured to be coupled to the engine, and configured to receive an input from the engine, and to provide an alternating current (AC) output;
   a power rectifier configured to receive the AC output from the generator and provide a direct current (DC) output responsive to receiving the AC output from the generator;
   a DC bus coupled to the rectifier;
   a propulsion battery system coupled to the DC bus; and
   at least one traction inverter coupled to the DC bus, the at least one traction inverter coupled to at least one corresponding traction motor;
   wherein the propulsion circuit is configured to provide:
   a first rectifier state configured to provide propulsion energy; and
   a second rectifier state configured to provide charging to the propulsion battery system via at least one of the at least one traction inverter, wherein the first and second rectifier states are defined by use of different winding portions of the generator.

7. The propulsion circuit of claim 6, further comprising:
   a boost rectifier coupled to the DC bus;
   a circuit path coupled to a first point between the generator and the power rectifier and to the boost rectifier;
   a routing component disposed along the circuit path; and
   a transformer disposed along the circuit path.

8. The propulsion circuit of claim 6, further comprising:
   a transfer switch interposed between the generator and the power rectifier;
   a circuit path coupled to the generator and the transfer switch; and
   a transformer disposed along the circuit path.

9. The propulsion circuit of claim 6, wherein the generator comprises an alternator defining a first winding portion and a second winding portion, wherein the first rectifier state utilizes one of the first winding portion or the second winding portion, and the second rectifier state utilizes the other of the first winding portion or the second winding portion.

10. The propulsion circuit of claim 9, wherein:
    the propulsion circuit comprises a boost rectifier coupled to the DC bus;
    the first winding portion is an inner winding portion and the second winding portion is an outer winding portion, the inner winding portion and outer winding portion connected in series;
    the propulsion circuit comprises a circuit path coupled to the outer winding portion and the boost rectifier; and
    the propulsion circuit comprises a routing component disposed along the circuit path.

11. The propulsion circuit of claim 9, wherein:
    the first winding portion is an inner winding portion and the second winding portion is an outer winding portion, the inner winding portion and outer winding portion connected in series;
    the propulsion circuit comprises a transfer switch interposed between the inner winding portion and the power rectifier; and
    the propulsion circuit comprises a circuit path coupled to the outer winding portion and the transfer switch.

12. The propulsion circuit of claim 9, wherein:
    the propulsion circuit comprises a boost rectifier coupled to the DC bus;
    the first winding portion is coupled to the power rectifier;
    the propulsion circuit comprises a circuit path coupled to the second winding portion and the boost rectifier; and
    the propulsion circuit comprises a routing component disposed along the circuit path.

13. The propulsion circuit of claim 9, wherein:
    the first winding portion is coupled to the power rectifier;
    the propulsion circuit comprises a transfer switch interposed between the first winding portion and the power rectifier; and
    the propulsion circuit comprises a circuit path coupled to the second winding portion and the transfer switch.

14. A propulsion circuit for a vehicle having an engine comprising:
    a generator configured to be coupled to the engine, and configured to receive an input from the engine, and to provide an alternating current (AC) output;
    a power rectifier configured to receive the AC output from the generator and provide a direct current (DC) output responsive to receiving the AC output from the generator;
    a DC bus coupled to the rectifier;
    a propulsion battery system coupled to the DC bus; the propulsion battery system including a battery controller and plural battery units, the battery controller configured to switch between a first configuration and a second configuration, wherein at least of some of the battery units are connected in parallel in the second configuration; and
    at least one converter configured to convert a received direct current to a produced alternating current, the at least one converter coupled to the DC bus, wherein the at least one converter is also configured to convert a received alternating current to a produced direct current and provide the produced direct current to the propulsion battery system;

wherein the propulsion circuit is configured to selectably provide a charge to the battery system via the at least one converter by re-directing at least a portion of the AC output from the generator to the at least one converter without passing through the power rectifier.

15. The propulsion circuit of claim 14, wherein the battery controller is configured to switch between the second configuration and the first configuration based on a mode of operation of the vehicle.

16. The propulsion circuit of claim 15, wherein the battery controller is configured to switch to the second configuration responsive to the vehicle entering a stationary charging mode.

17. The propulsion circuit of claim 14, wherein the generator comprises an alternator without active voltage control.

18. The propulsion circuit of claim 14, further comprising a passive rectifier.

19. The propulsion circuit of claim 14, wherein each battery unit comprises plural batteries.

20. The propulsion circuit of claim 19, wherein the battery controller is configured to independently connect and disconnect each battery unit.

* * * * *